United States Patent [19]
Schweitzer, III et al.

[11] Patent Number: 5,262,679
[45] Date of Patent: Nov. 16, 1993

[54] POLARIZING POTENTIAL TRANSFER SWITCH CIRCUIT FOR USE WITH POWER TRANSMISSION LINES

[75] Inventors: Edmund O. Schweitzer, III, Pullman; Jeffrey B. Roberts, Albion; William D. Hawbaker, Pullman, all of Wash.

[73] Assignee: Schweitzer Engineering Laboratories, Inc., Pullman, Wash.

[21] Appl. No.: 737,373

[22] Filed: Jul. 29, 1991

[51] Int. Cl.⁵ .............................................. H02B 1/24
[52] U.S. Cl. .................................. 307/127; 307/125; 361/86
[58] Field of Search ...................... 361/79, 85, 86, 87; 307/112, 116, 125, 126, 127

[56] References Cited
U.S. PATENT DOCUMENTS 4,234,901  11/1980  Strickland, Jr. ...................... 361/87
4,745,512  5/1988  Hampson ............................. 361/85
4,835,651  5/1989  Li et al. ............................... 361/79

*Primary Examiner*—Jeffrey A. Gaffin

[57] ABSTRACT

The polarizing potential transfer switch system takes advantage of an existing loss-of-potential (LOP) circuit (32) in a power transmission line protective system to differentiate between a trip signal produced by the distance elements in a protective relay (22) due to the operation of the transfer switch and a true fault condition. This is accomplished by a logic circuit (40) which includes a first timer (58) which permits the operator of the transfer switch (10) five seconds to complete the potential transfer operation between two buses (14 and 16) and a second timer (68) which gives the LOP circuit (32) a selected number of cycles in which to block a trip signal produced by the distance elements in the relay (22).

9 Claims, 1 Drawing Sheet

POLARIZING POTENTIAL TRANSFER SWITCH CIRCUIT FOR USE WITH POWER TRANSMISSION LINES

TECHNICAL FIELD

This invention relates generally to the art of power transmission line protective equipment and more specifically concerns a circuit to be used with a relay polarizing voltage transfer switch to prevent opening of a circuit breaker which could otherwise be the undesirable result of the normal operation of the transfer switch.

BACKGROUND OF THE INVENTION

Power transmission line systems typically include multiple buses of high voltage. It is a common practice to transfer portions of the transmission line system to which power users are connected from one high voltage bus to another, while maintaining the actual current load through the circuit breaker to the transmission line. During such a transfer between two buses, the high voltage source, referred to as the source feed, is thus changed without interrupting power to the load. This is accomplished by first connecting the original bus supplying high voltage and a second bus in parallel and then opening the original bus. The result is a continuous feed of high voltage load current to the customer.

Since this is a normal part of the operation of a transmission line system, the transfer of the high voltage potential feed from one bus to another should not in and of itself cause an alarm output from any of the protective relays for the system which would in turn result in the opening of a circuit breaker protecting that portion of the system. Such an alarm output from a protective relay is typically referred to as a trip signal.

In fact, however, such a trip signal may result from such a bus transfer, during periods of high current flow, unless the transfer is accompanied by corrective action taken in conjunction with the operation of the transfer switch.

A trip signal may occur because the transfer switch operates on "a break before make" basis. Hence, there will actually be a momentary loss of polarizing potential to the protective relay before the transfer to the new bus is completed. This momentary loss of potential, accompanied by high current flow through the protective relay and the associated circuit breaker, will be recognized by the protective relay as a fault condition and it will subsequently produce a trip signal. However, that trip signal, which results in the opening of the breaker, is undesirable because it is not in fact indicative of a true fault condition and results in an interruption of power to the customers serviced by the transmission line.

The general problem of detecting such a loss-of-potential condition and thereafter blocking the opening of the breaker by means of a trip signal output from the protective relay has been addressed by what is known as a loss-of-potential (LOP) circuit, which recognizes a loss-of-potential condition which is not indicative of a true fault. The loss-of-potential circuit output is used in effect to suppress the trip output from the distance elements of the relay, so that the circuit breaker will not open and power is maintained to the end user customers. However, in some cases, a "race" condition results between the LOP output and selected distance (or other) protective elements, the result of which an LOP condition is interpreted as a true fault condition and the circuit breaker is opened. One solution to this problem is to provide a five second time delay for the LOP "set" signal, to prevent the LOP logic circuit from blocking relay tripping for true fault conditions. Such a solution does result, however, in the LOP logic not being effective in blocking the operation of the relay during polarizing voltage transfer operations.

Another alternative solution is to slow down the distance relay logic. However, the rapid detection of system faults is critical, and hence any slow down in the detection of those faults is not acceptable. Hence, there remains a need for a clear and reliable differentiation between a loss-of-potential condition due to the operation of a potential transfer switch and a true fault condition for which a circuit breaker should be operated.

DISCLOSURE OF THE INVENTION

Accordingly, the present invention is a polarizing potential transfer switch system which is useful with a power transmission line protective system which includes a loss-of-potential circuit and a protective relay circuit which produces circuit breaker trip signals in response to possible fault conditions, comprising:

a polarizing potential transfer switch for switching power between first and second polarizing potential bus lines in which the transfer switch includes an open position between contact with the first bus and the second bus;

means providing an indication of when the transfer switch is moved to its open position;

a first timer means responsive to said indication for producing a first timer output signal for a first interval of time, in the absence of a trip signal during a previous first period of time;

first gate means for producing a first gate output signal upon the coincidence of the first timer output and a trip signal;

a second timer means responsive to the first gate output signal to produce a second timer output signal for a second interval of time sufficient to permit a loss-of-potential circuit to block a trip signal; and a second gate means responsive to the coincidence of a trip signal and the lack of a second timer output signal to produce a circuit output signal which in turn will be used to open a circuit breaker.

BRIEF DESCRIPTION OF THE DRAWINGS

The figure is a block diagram of the circuit of the present invention.

BEST MODE FOR CARRYING OUT THE INVENTION

Figure 1:
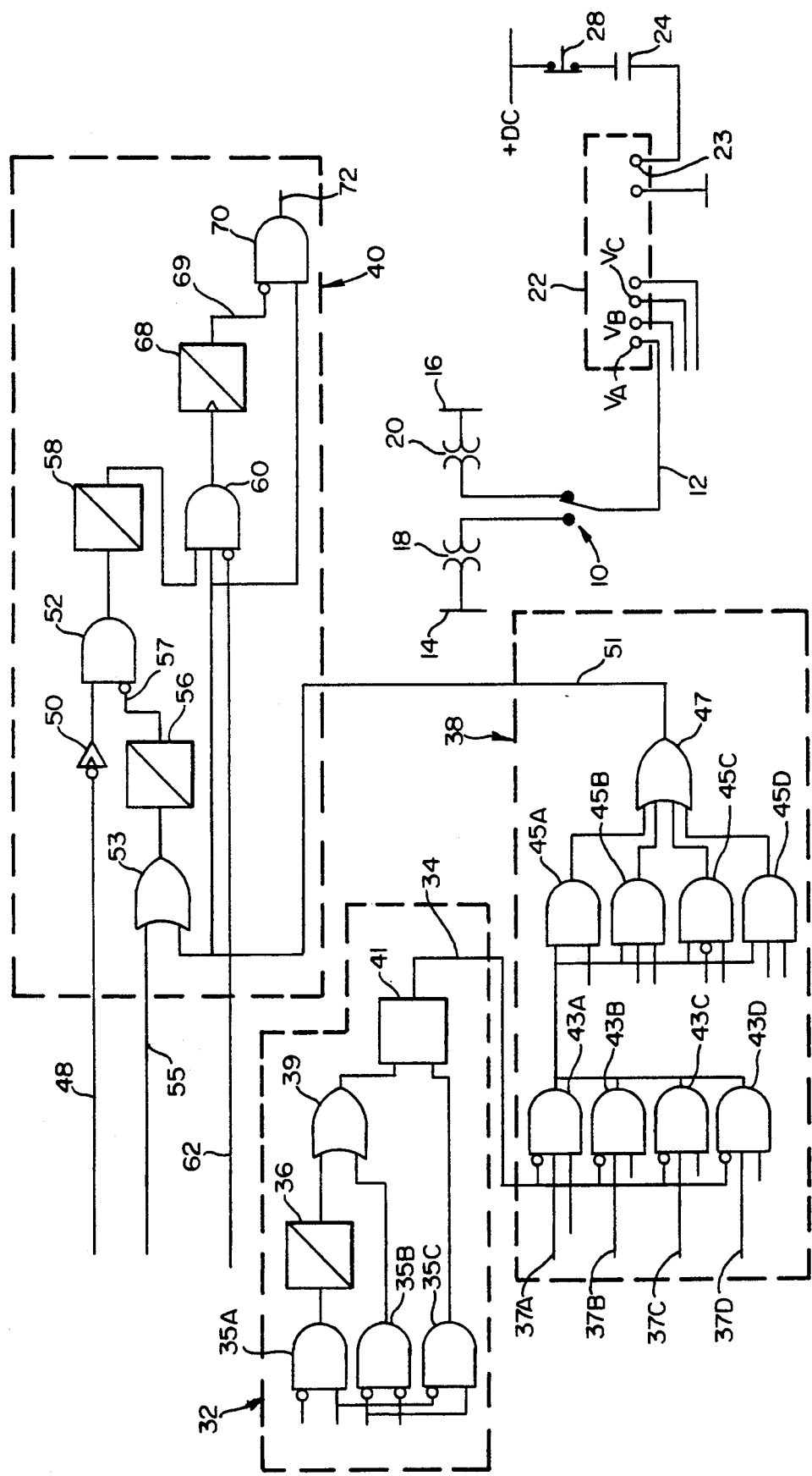

Referring to the figure, the polarizing potential transfer switch is shown representationally at 10. The function of a potential transfer switch in a power transmission line protection system is to switch a given relay polarizing source shown generally at 12 between the secondaries of two polarizing voltage sources, appearing, respectively, on first bus 14 and second bus 16. The high voltages on the buses are transformed by respective polarizing potential transformers 18 and 20, prior to reaching the transfer switch 10. A protective relay is shown generally at 22, with the voltage on line 12 being shown as a phase A polarizing voltage, for purposes of illustration, to the relay, the other phases being B and C. The relay 22 also includes a input connection 23 to the relay from a particular contact (referred to as a 52A contact) on the circuit breaker for the line (not shown).

The push-to-open contact 28 of the polarizing potential transfer switch 10 is normally in a closed position, such that there is a continuous voltage signal from the DC supply through 52A relay contact 24 to input 23 of the relay 22. The polarizing potential transfer switch 10 operates on a break-before-make basis, so that when transfer switch 10 is pushed in by the operator, the 52A input to the relay is de-energized; the switch is then rotated and released during which time contact is broken with bus 14, resulting in a loss of polarizing voltage to the relay until contact is made by the switch to the secondaries of the polarizing potential transformer for bus 16, resulting in contact between bus 16 and line 12, through the polarizing potential transformer 20.

While the embodiment described shows the push-to-open contacts 28 of the transfer switch 10 being in series with breaker contact 24, thus providing a reliable indication that the transfer switch has been opened, it should be understood that other circuit configurations or arrangements can be used to provide a reliable indication that the transfer switch has been operated. The figure also includes a conventional loss-of-potential (LOP) signal circuit, shown generally at 32, which produces a signal output on line 34 when a loss-of-potential condition is detected. LOP circuit 32 generally includes a plurality of AND gates 35A-35C, responsive to several logic element inputs indicative of voltage and current conditions at various points in the transmission line system. The output of AND gate 35A is applied to a 50 millisecond timer 36, the output of which is in turn applied to an OR gate 39, along with an output from AND gate 35B. The output of OR gate 39 is an LOP "set" signal, which is applied to latch 41. Latch 41 is reset by the output from AND gate 35C.

Signals from several of the individual protective elements in the relay 22 are shown generally on lines 37A-37D, including in particular in this embodiment distance elements covering transmission line zones 1-4. These elements could be three phase or phase-to-phase. Signal lines 37A-D are applied as inputs to a plurality of AND gates 43A-43D. The outputs of AND gates 43A-43D are then applied as shown to AND gates 45A-45D, along with other relay bit inputs. The outputs of AND gates 45A-45D are then applied to an OR gate 47.

The output from the LOP circuit on line 34 is applied to AND gates 43A-43D (inverted at the inputs thereto), which overrides the trip signal inputs from the distance elements and thus prevents a trip output signal from occurring on line 51 from OR gate 47. It should be understood that circuits 32 and 38 are conventional and well-known. A simple description is included herein for completeness of the description of the present invention, although the circuits and their inputs are not described in detail. In general terms, an LOP signal occurs on line 34 and a trip signal from various distance elements occurs on line 51.

As indicated above, when polarizing potential transfer switch 10 initiates a change in polarizing voltage source between two buses, i.e. bus 14 and 16, there will be a momentary interruption of polarizing potential to the protective relay, even though current continues through the associated circuit breaker. As indicted above, the LOP circuit is designed to prevent tripping of a breaker when only a loss-of-potential is involved and not a true fault. One example of the use of an LOP circuit is when one or more fuses in the secondary of the polarizing potential transformers operate but no actual fault exists. However, the LOP circuit must not block or mask true fault conditions. The apparatus of the present invention is designed to differentiate between trip signals resulting from true fault conditions and those from true LOP conditions during the time surrounding the operation of the potential transfer switch. In such a case, the present invention in effect suppresses the trip signal for a set time until the LOP logic operates. This is done by the detection logic circuit shown in block 40. Its function is two-fold. First, to permit true fault indications produced by the protective relay elements to produce a trip signal, which is then used to open the associated circuit breaker, and secondly, to permit the LOP circuit to block the output of the relay elements where there is a loss of potential which is due to operation of the potential transfer switch.

Referring now specifically to block 40 of the figure, the DC voltage signal from the associated circuit breaker, referred to herein as a "52A" input signal, is applied on an input line 48 to a falling edge-triggered inverter 50. During normal operation, the 52A input signal is high, such that the output of inverter 50 is usually low. The output of inverter 50 is applied to AND gate 52, the output of which remains low as long as the output from inverter 50 remains low. The other input to AND gate 52 is derived from the combination of a signal which indicates whether or not the breaker trip contact has been closed on input line 55 and a trip signal produced by the relay elements (or not) on input line 51. These two signals are applied to an OR gate 53 and from there to a 255 quarter cycle, instantaneous pickup-delayed dropout timer 56. Normally, the output of timer 56 is low, and therefore the signal at input 57 to AND gate 52 is high, since the signal at the output of timer 56 is inverted at the input to AND gate 52. The output of AND gate 52 is thus normally low. The output signal from AND gate 52 is applied to a 5 second instantaneous pick-up/time delay dropout timer 58, the output of which is thus also normally low.

The trip signal on line 51 (normally low) and a signal indicating whether or not trip contacts for the breaker have been closed in the last quarter cycle (line 62) are also applied to AND gate 60. Normally, the signal on line 62 is low, such that the input to AND gate 60 is high, since the signal on line 62 is inverted at the input to the AND gate. Since the normal inputs to AND gate 60 are two lows and a high, the output from AND gate 60 to 3 cycle timer 68 is normally low. The input to AND gate 70 from timer 68 is thus normally high, while the other input to AND gate 70, from the trip signal on line 51, is normally low. Thus the output from AND gate 70 is normally low.

As mentioned above, as long as the 52A input signal to the relay continues, the signal from the inverter 50 will continue low. When the transfer switch 10 is operated, thereby breaking the polarizing transformer connection between bus 14 and line 12, the 52A input signal to the relay and on line 48 will fall. The falling edge of the signal on line 48 will result in a spike output of inverter 50. This will produce a corresponding high input pulse signal to AND gate 52. If there has been no trip signal on line 51 for the previous 255 quarter cycles and if the trip contacts on the breaker have not been closed for the previous 255 quarter cycles, the signal from timer 56 at the input to AND gate 52 will remain high, thereby producing a high output. This will result in timer 58 producing a high output for a specified period of time, in this embodiment five seconds. Five seconds is somewhat arbitrary. It basically permits the operator of the polarizing potential transfer switch that amount of time to complete the transfer operation, i.e. to push in the transfer switch thus de-energizing the 52A input to the relay, and move the switch to the other bus position and release the transfer switch. The 5 second timer could be varied. Whatever the amount of the timer, the transfer operation must be completed in that time.

During the 5 second interval, there is a high output signal from timer 58 to AND gate 60. If the breaker trip contacts have not been closed within the last quarter cycle, the input to AND gate 60 on line 62 (inverted) remains high.

As explained above, when the transfer switch 10 is opened, the distance elements may produce a trip signal, i.e. 51 may go high, before the conventional LOP logic produces a "set" output. It is this trip signal on line 51 which must be masked for a time since it is not an indication of a valid fault and since the LOP circuit 32 may not have had sufficient time to block the trip signal on line 51, such as might occur because of the increased speed of the response from the distance elements due to the high load currents from the transmission line. All of the inputs to AND gate 60 are now high, which produces a high output which in turn is present for three cycles. For these three cycles, the input to AND gate 70 from timer 68 will be low, due to the inverter at input 69, so that there hence will be no trip signal output on line 72, even if a trip signal occurs on line 51 from the distance elements during the three cycle time period. Timer 58 thus gives the operator 5 seconds to complete the operation of the transfer switch while timer 68 provides three cycles for the LOP circuit to in effect block the output of OR gate 47.

If the breaker trip contact has been made during the last 255 quarter cycles (input line 55 and timer 56), the input 57 to AND gate 52 will go low, and ultimately the input 69 of AND gate 70 from timer 68 will be held high and a trip signal on line 51 will result in a trip output on line 72 from AND gate 70, as long as the breaker trip contact did not close within the last quarter cycle. Under these conditions, a trip output results even if the potential transfer switch is operated.

Hence, a circuit has been disclosed which operates with a conventional loss-of-potential (LOP) circuit to appropriately mask or block a trip signal from distance elements due to the operation of a polarizing potential transfer switch, involving no true fault condition, while at the same time permitting trip signals from the same distance elements which are in fact indicative of a true fault condition to proceed through the circuit to produce a trip signal output on line 72.

It should be understood that a preferred embodiment has been disclosed for purposes of illustration. Modifications, variations and substitutions of such embodiment may be accomplished without departing from the spirit of the invention, which is defined by the claims which follow:

What is claimed is:

1. A polarizing potential transfer switch system which is useful with a power transmission line protective system which includes a loss-of-potential circuit and a protective relay circuit which produces circuit breaker trip signals in response to possible fault conditions, wherein sources of trip signals include true fault conditions, wherein sources of trip signals include true fault conditions on a transmission line and transfer switch operations, comprising:

a polarizing potential transfer switch for switching power between first and second polarizing potential bus lines in which the transfer switch includes an open position between contact with the first bus and the second bus;

means providing an indication of when the transfer switch is moved to its open position;

a first timer means responsive to said indication for producing a first timer output signal for a first interval of time, in the absence of a trip signal during a previous first period of time;

first gate means for producing a first gate output signal upon the coincidence of the first timer output and a trip signal;

a second timer means responsive to the first gate output signal to produce a second timer output for a second interval of time sufficient to permit a loss-of-potential circuit to block a trip signal; and a second gate means responsive to the coincidence of a trip signal and the lack of a second timer output signal to produce a circuit output signal which in turn will be used to open a circuit breaker.

2. An apparatus of claim 1, wherein the indication providing means includes a series connection of a circuit breaker contact, a source of dc voltage and contacts on the potential transfer switch.

3. An apparatus of claim 1, wherein the first interval of time is approximately five seconds, and wherein the second interval of time covers approximately three cycles.

4. An apparatus of claim 1, wherein said first previous period of time is approximately 255 quarter cycles.

5. An apparatus of claim 4, wherein the first timer means produces a first timer output only in the absence of a trip signal and the absence of circuit breaker trip contacts being closed within said first previous period of time.

6. An apparatus of claim 1, wherein the first gate means provides the first gate output signal upon the coincidence of the first timer output, a trip signal and the absence of circuit breaker trip contacts being closed within a second previous period of time.

7. An apparatus of claim 6, wherein the second previous period of time covers ¼ cycle.

8. An apparatus of claim 7, wherein the apparatus an edge-triggered inverter providing an inverter output signal when the potential transfer switch moves to an open position, an OR gate responsive to a trip signal or a circuit breaker trip contact signal, a 255 quarter cycle, instantaneous pickup, third timer means responsive to the OR gate and an AND gate responsive to the edge-triggered inverter and the absence of an output from the third timer means to initiate the first timer output.

9. An apparatus of claim 8, wherein the first and second gate means are AND gates.

* * * * *

UNITED STATES PATENT AND TRADEMARK OFFICE
CERTIFICATE OF CORRECTION

PATENT NO. : 5,262,679
DATED : November 16, 1993
INVENTOR(S) : Edmund O. Schweitzer III, et al It is certified that error appears in the above-identified patent and that said Letters Patent is hereby corrected as shown below:

Col. 6, Claim 1, line 5-6 delete the phrase " ,wherein sources of trip signals include true fault conditions".

Signed and Sealed this

Third Day of May, 1994

Attest:

BRUCE LEHMAN

Attesting Officer

Commissioner of Patents and Trademarks